July 13, 1954
H. G. MILLER
2,683,576
HYDRAULIC STABILIZING SUPPORT
Filed June 14, 1949
FIG. 1.
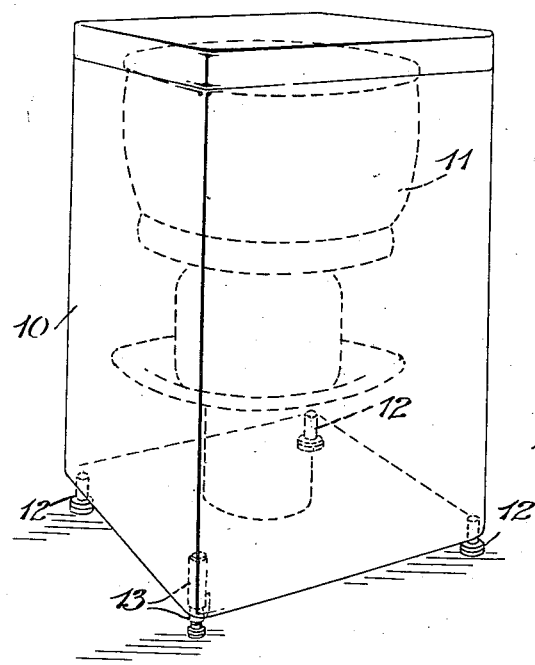
FIG. 3.
FIG. 2.
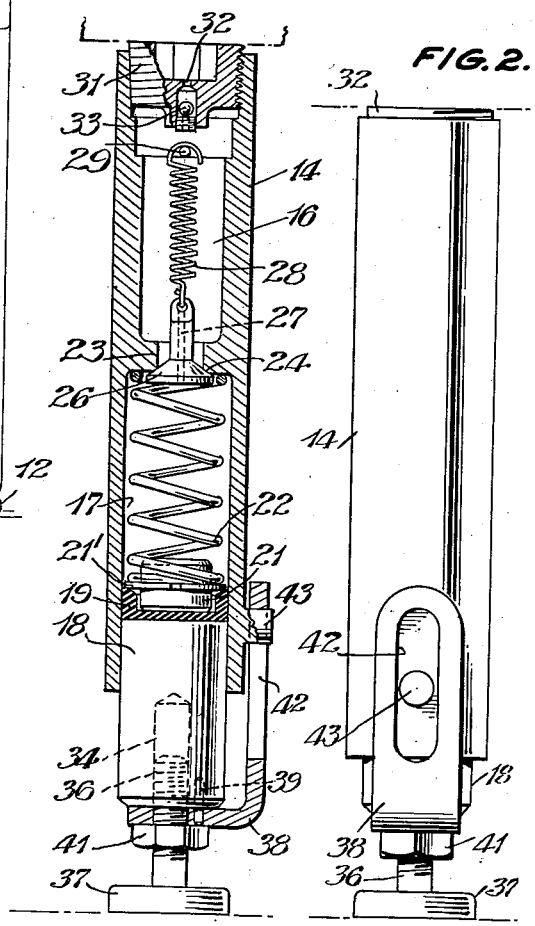
INVENTOR
HARRY G. MILLER
BY *Harper Allen*
ATTORNEY Patented July 13, 1954

2,683,576

UNITED STATES PATENT OFFICE 2,683,576

HYDRAULIC STABILIZING SUPPORT

Harry G. Miller, San Jose, Calif.

Application June 14, 1949, Serial No. 98,996

5 Claims. (Cl. 248—24)

The present invention relates to hydraulic stabilizing supports for equipment which may be subjected to vibration during operation, and is concerned more particularly with a support which will automatically serve to stabilize the equipment on the supporting elements.

In connection with power driven equipment subject to vibration, for example, automatic washers employing centrifugal spinners for drying, the four supporting legs have been found very difficult to adjust accurately in height, so that the equipment is supported uniformly and firmly on the floor. It has been found that any unevenness of the support of such equipment tends to amplify and increase the vibration difficulties due to any out-of-balance condition, either by virtue of the equipment itself or by virtue of the arrangement of the clothes within the dryer.

It is a general object of the invention to provide vibratory equipment with automatic stabilizing support means to compensate for unevenness in the level of the floor.

Another general object of the invention is to provide a support for equipment which automatically compensates for unevenness in support of the equipment on the floor and which will automatically adjust itself to changing conditions in the supporting surface for the equipment.

Other objects and advantages of the invention will be apparent from the following description of a preferred embodiment thereof, as illustrated in the accompanying drawings, in which:

Figure 1 is a perspective view of a piece of vibratory equipment such as an automatic washer embodying the instant invention.

Figure 2 is an elevational view of the automatic stabilizing support in operative position.

Figure 3 is a vertical sectional view through the stabilizing and automatically adjusting support showing the support in fully expanded position.

Referring to Figure 1, there is shown an equipment unit 10 subject to vibrations when operating. The unit 10 shown by way of example is an automatic washer equipment unit of a type commonly on the market under the trade name "Frigidaire," and employing a rotatable bowl 11 which is used to spin-dry the clothes after washing. The cabinet is provided with three legs or supports 12 of conventional construction and the fourth support 13 is an automatic stabilizing support embodying the instant invention.

Referring to Figures 2 and 3, the support includes a tubular casing 14 which may be suitably connected to the frame of the washer 10 by brazing or by means of a suitable bracket (not shown) embracing the cylindrical body 14. The upper portion of the body 14 is recessed to provide a liquid reservoir 16 which in use is partially filled with hydraulic fluid while the lower portion is bored to provide a chamber or cylinder element 17 within which a relatively movable plunger or piston element 18 is slidably mounted. In use, the chamber or cylinder 17 is completely filled with hydraulic fluid. The plunger or piston member 18 abuts a cup leather or rubber 19 which is held against the plunger 18 by spring supporting plug 21 and a spring 22. The plug 21 may be provided with an annular spring-supporting flange 21' which is cutaway for the passage of the hydraulic fluid such as oil.

Between the reservoir 16 and the cylinder 17 there is provided an annular shoulder 23 defining a port or passage having a valve seat 24 formed at the lower surface thereof and surrounding the relatively large port opening and normally engaged by a poppet or check valve 26 having a relatively small or restricted aperture or bleeder passage opening means 27 through the stem thereof. The shoulder 23 provides an anchorage or abutment for the upper end of the spring 22. A spring 28 extending between the stem of the valve 26 and a pin 29 lightly urges the valve 26 against its seat. The upper end of the reservoir 16 is closed by a threaded plug 31 having a central aperture 32 therein provided with a valve seat for closing by a gravity-type ball valve 33 in an inverted position of the equalizer. The ball valve 33 may be omitted, if desired.

The plunger or piston 18 is provided with a threaded aperture 34 at its lower end engaged by a threaded stud 36 carried by a floor engaging foot part 37. The stud 36 passes freely through an angle shaped guide bracket 38 which is secured in position with respect to the plunger 18 by means of a pin 39. A locknut 41 is employed to secure the foot 37 in adjusted position with respect to the plunger 18. The longitudinal portion of the bracket 38 is provided with an elongated slot 42 and engages over a stud 43 on the casing 14 so that the plunger 18 is positively guided in its relation to the cylinder 17 and can move within fixed limits determined by the length of the slot 42.

In operation, the automatically extensible and automatically adjusting support element can be extended at will by virtue of the unseating of the poppet valve 26 to admit more of the hydraulic oil from the reservoir 16 through the port 23 into the cylinder or chamber 17, the port 23 defining a fluid passage of such size as to provide for relatively free flow of fluid from the reservoir to the cylinder 17. However, shortening of its length is accompanied by closing of the valve 26 and therefore is resisted or damped and can be accomplished only slowly by virtue of the restricted bleed aperture 27 in the poppet valve 26. When a piece of equipment is installed an initial rough adjustment of the height of the support leg 13 is made by means of the threaded engagement of the support 37 with the piston 34 to establish the range of automatic adjustment thereof. If the support 13 is the leg that is too long, it will shorten gradually, due to being hydraulically damped, until it supports its proper amount of weight on the spring 22 when any decrease in length will stop. Thus, the spring 22 should be strong enough to enable it, when compressed initially by the application of a part of the static load of the equipment 10, to support a part of the load. If the leg 13 is too short, the spring 22 will expand its length the proper amount. It will be noted that movement of the equipment 10 which would tend to lift the foot 37 off the floor automatically causes the support to extend itself by virtue of the spring 22 and the unseating of the valve 26 until a firm stabilized support condition is established. When such a support is subjected to vibration, it responds immediately to the effect of the vibration tending to lengthen it due to automatic unseating of valve 26, as the lengthening of the chamber 17 produces a pressure differential which can not be satisfied immediately by the passage 27 because of its small size, and which results in opening of the valve 26. To shorten the stabilizer, the restricted passage 27 allows a slow introduction of liquid from the chamber 17 to the reservoir 16 to allow the stabilizer to adjust in length to the level of floor conditions, but resists the effect of any rapid movement tending to shorten it. As a result, within a few seconds of the time the equipment is set into place and started in operation, the support will adjust itself automatically to the proper length and maintain this length. Thus when a washing machine or similar type of equipment is moved from place to place and unevenness of the floor results in improper spacing of the supports, the automatic support adjusts itself readily to such changed condition that a firm foundation is always assured for the equipment. This materially reduces the effect of vibration of the equipment.

The subject of vibrations, harmonics, and related phenomena is complex; and I do not profess to be able to expound precisely the theory of operation of my construction. However, judging from observations of the construction in operation, I believe that when the feet 12, 12, and 12, and the foot 37 are all bearing parts of the total static load, and the equipment 10 then starts to operate there will be cyclic tendency to apply increased and then decreased load on the foot 37, due to kinetic imbalance of the equipment 10. In a half cycle during which the tendency is to decrease the load on the foot 37, the foot 37 will tend to lift from the supporting surface; and, due to the ability of the valve 26 to open easily against the light urge of the spring 28, the spring 22 will quickly project the plunger member 18 to bring the foot 37 back into contact with the supporting surface, or substantially to maintain the foot 37 in contact with the supporting surface. In the ensuing half cycle, the conditions are reversed, that is additional load, due to unbalanced conditions of the equipment 10, will be imposed on the foot 37, but the plunger 18 cannot move back into the cylinder with the same rapidity, and hence not through the same distance in a half cycle, as it moved outwardly during the first half cycle. This is due to the fact that when additional load is imposed on the foot 37, the plunger 18, in moving into the cylinder, must overcome the resistance to forcing the fluid from the cylinder 17 through the orifice or restricted aperture 27, whereas when the load on the foot 37 is lessened, the valve 24 opens, providing a relatively large open port for flowing of fluid from the reservoir 16 into the cylinder 17. Observations of operation of the construction indicate that a series of cycles takes place, each including a relatively long extension stroke or outward movement of the plunger 18 followed by a relatively short retraction stroke or inward movement of the plunger, the extension and retraction strokes both becoming progressively shorter until a condition of substantial equilibrium of the plunger 18 and foot 37 is established and thereafter maintained.

While I have shown and described a preferred embodiment of the invention, it will be apparent that it is capable of modifications and variations within the scope of the claims appended hereto.

I claim:

1. The combination with a piece of vibratory equipment of at least four floor engaging supports therefor, at least one of said supports comprising a telescoping stabilizer including a cylinder element and a piston element slidable therein and having spring means urging said piston element to move relatively outwardly with respect to said cylinder element for lengthening said one support, one of said elements being secured to said piece of equipment and the other of said elements having a floor engaging part thereon, and hydraulic means for resisting movement of said piston element relatively inwardly with respect to said cylinder element, said hydraulic means comprising said cylinder element filled with fluid subjected to the weight on said one support, a reservoir partially filled with fluid, passage means adapted to provide communication between said cylinder element and said reservoir, valve means operable in response to outward movement of said piston element with respect to said cylinder element to permit relatively free flow of fluid from said reservoir through said passage means to said cylinder element and closable in response to inward movement of said piston element with respect to said cylinder element, and means providing for only relatively restricted flow from said cylinder element to said reservoir.

2. In a hydraulic support and stabilizer for equipment, a cylinder having a piston movable therein, a floor engaging support on the piston, a spring urging said piston outwardly of said cylinder, a fluid reservoir above said cylinder, said reservoir being partially filled with fluid and said cylinder being filled with fluid, means providing for relatively restricted fluid flow from said cylinder to said reservoir, a valve seat between said cylinder and said reservoir, and valve means mounted to move away from said seat in response to outward movement of said piston with respect to said cylinder to open in a direction to permit relatively unrestricted flow of fluid from the reservoir through said seat to the cylinder and to move towards said seat in response to inward movement of said piston with respect to said seat to close to prevent flow from said cylinder through said seat to said reservoir.

3. In a hydraulic support and stabilizer for equipment, a cylinder having a piston movable therein, a floor engaging support on the piston, a spring urging said piston outwardly of said cylinder, a fluid reservoir above said cylinder, said reservoir being partially filled with fluid and said cylinder being filled with fluid, a relatively small fluid passage opening between said reservoir and said cylinder, a relatively large fluid passage opening between said reservoir and said cylinder, a valve seat surrounding said relatively large opening, and a check valve means mounted to move away from said seat in response to outward movement of said piston with respect to said cylinder to open in a direction to admit fluid from the reservoir to the cylinder and to move towards said seat in response to inward movement of said piston with respect to said seat to close to prevent flow from said cylinder through said relatively large opening into said reservoir.

4. The combination with vibratory equipment of legs for supporting the equipment on a floor; at least one of said legs being a hydraulically damped stabilizer including a cylinder element having a piston element slidably mounted therein, a spring urging said piston element outwardly of said cylinder element, one of said elements being secured to said equipment and the other of said elements having a floor engaging part thereon, a fluid reservoir adjacent to said cylinder element, said reservoir being partially filled with fluid and said cylinder being filled with fluid, fluid passage means communicating with said cylinder element and said reservoir and being of such size as to provide for relatively free flow of fluid from said reservoir to said cylinder element, a valve seat in said fluid passage means, a check valve means mounted to move away from said seat in response to outward movement of said piston element with respect to said cylinder element to open in a direction to admit fluid relatively freely only from the reservoir to the cylinder element and to move towards said seat in response to inward movement of said piston element with respect to said cylinder element to close and prevent fluid flow from said cylinder element through said fluid passage means to said reservoir, and other means for admitting fluid relatively restrictedly from said cylinder element to said reservoir.

5. The combination with an equipment unit subject to vibrations when operating; of a plurality of spaced legs for supporting said unit on a floor, at least one of said legs being adjustable as to length and comprising a fluid reservoir partially filled with fluid, a fluid chamber element filled with fluid, relatively restricted passage means providing for relatively slow flowing of fluid from said chamber element into said reservoir, a relatively unrestricted port adapted to provide for relatively fast flowing of fluid from said reservoir into said chamber element, a check valve means mounted to move towards and away from said port and being automatically responsive to relatively increased fluid pressure in said chamber element for moving towards and closing said port to prevent flowing of fluid from said chamber element through said port into said reservoir and being automatically responsive to relatively decreased fluid pressure in said chamber element for moving away from and opening said port to permit flowing of fluid from said reservoir through said port into said chamber element, a relatively movable element subjected to the fluid pressure in said chamber element and being mounted to move relative to the chamber element concomitantly with lengthening and shortening of said one of said legs and thereby changing of the volume of said chamber element, a floor engaging part connected to one of said elements, a spring anchorage, and a spring operatively connected to said spring anchorage and to said relatively movable element and urging said relatively movable element to move relatively rapidly in a direction to lengthen said one of said legs and to increase the volume of said chamber element with consequent decreasing of the fluid pressure in said chamber element and opening of said check valve means and relatively rapid flowing of fluid from said reservoir through said port into said chamber element, said spring being yieldable in response to increasing of the load on said one of said legs for permitting said relatively movable element to move relatively slowly in the opposite direction to shorten said one of said legs and to decrease the volume of said chamber element with consequent increasing of the fluid pressure in said chamber element and closing of said check valve means and relatively slow flowing of fluid from said chamber element through said passage means into said reservoir.

References Cited in the file of this patent

UNITED STATES PATENTS

| Number | Name | Date |
| --- | --- | --- |
| 1,683,351 | Herr | Sept. 4, 1928 |
| 1,821,787 | Black | Sept. 1, 1931 |
| 2,055,715 | Barker | Sept. 29, 1936 |
| 2,196,068 | Greve | Apr. 2, 1940 |
| 2,243,565 | Kimball et al. | May 27, 1941 |
| 2,387,066 | Harding | Oct. 16, 1945 |
| 2,496,710 | Goddard | Feb. 7, 1950 |
| 2,540,750 | Morrison | Feb. 6, 1951 |

FOREIGN PATENTS

| Number | Country | Date |
| --- | --- | --- |
| 441,636 | Great Britain | Jan. 23, 1936 |
| 695,881 | Germany | Sept. 5, 1940 |